(12) United States Patent
Murakami et al.

(10) Patent No.: US 8,177,412 B2
(45) Date of Patent: May 15, 2012

(54) KNEADING APPARATUS AND METHOD FOR KNEADING RUBBER-BASED COMPOSITION USING THE SAME

(75) Inventors: Masao Murakami, Takasago (JP); Norifumi Yamada, Takasago (JP); Ko Takakura, Takasago (JP); Kimio Inoue, Kobe (JP)

(73) Assignee: Kobe Steel, Ltd., Kobe-shi (JP)

( * ) Notice: Subject to any disclaimer, the term of this patent is extended or adjusted under 35 U.S.C. 154(b) by 0 days.

(21) Appl. No.: 13/205,265

(22) Filed: Aug. 8, 2011

(65) Prior Publication Data
US 2011/0292755 A1    Dec. 1, 2011

Related U.S. Application Data

(63) Continuation of application No. 11/249,633, filed on Oct. 14, 2005, now abandoned, which is a continuation of application No. 10/123,253, filed on Apr. 17, 2002, now Pat. No. 7,004,616.

(30) Foreign Application Priority Data

Apr. 25, 2001  (JP) ................................. 2001-127684

(51) Int. Cl.
  *B29B 7/82*   (2006.01)
  *B29B 7/84*   (2006.01)
  *B29B 13/04*  (2006.01)
(52) U.S. Cl. .............................. 366/75; 366/84; 366/147
(58) Field of Classification Search .................. 366/75, 366/76.1, 76.2, 76.3, 76.4, 76.6, 76.9, 76.93, 366/79–80, 83–86, 88–90, 147; 425/203, 425/204, 208, 209
See application file for complete search history.

(56) References Cited

U.S. PATENT DOCUMENTS

| 1,431,978 A | 10/1922 | Nesbitt |
| 3,034,421 A | 5/1962 | Pence |
| 3,070,836 A | 1/1963 | De Haven et al. |
| 3,225,453 A | 12/1965 | Reifenhauser |
| 3,371,379 A | 3/1968 | Reitenhauser |
| 3,633,880 A | 1/1972 | Newmark |
| 3,683,511 A | 8/1972 | Johnson et al. |
| 3,814,779 A | 6/1974 | Wiley |
| 3,917,507 A | 11/1975 | Skidmkore |
| 3,985,348 A | 10/1976 | Skidmore |

(Continued)

FOREIGN PATENT DOCUMENTS

CN   1051273 C   4/2000

(Continued)

*Primary Examiner* — Charles E Cooley
(74) *Attorney, Agent, or Firm* — Oblon, Spivak, McClelland, Maier & Neustadt, L.L.P.

(57) ABSTRACT

A kneading apparatus includes a barrel having a cylindrical chamber; a screw assembly rotating in the chamber so that a material to be kneaded is extruded in the axial direction by the rotation, the screw assembly including a screw section having helical blades and a kneading blade section in order to allow the material to flow into the clearance between the inner wall of the chamber and the kneading blade section, and to apply shearing forces to the material; a metering feeder for feeding the material at a substantially constant volumetric or gravimetric rate into the chamber; an injecting device for injecting a heat-removing medium into the chamber; and a discharging device for separating the heat-removing medium from the material and discharging the heat-removing medium from the chamber. A kneading method using the kneading apparatus is also disclosed.

3 Claims, 7 Drawing Sheets

U.S. PATENT DOCUMENTS

| | | |
|---|---|---|
| 4,029,300 A | 6/1977 | Morishima et al. |
| 4,100,244 A | 7/1978 | Nonaka |
| 4,107,787 A | 8/1978 | Ocker |
| 4,197,070 A | 4/1980 | Koschmann |
| 4,332,481 A | 6/1982 | Inoue et al. |
| 4,408,887 A | 10/1983 | Yamaoka |
| 4,423,960 A | 1/1984 | Anders |
| 4,446,094 A | 5/1984 | Rossiter |
| 4,462,691 A | 7/1984 | Boguslawski |
| 4,474,473 A | 10/1984 | Higuchi et al. |
| 4,491,417 A | 1/1985 | Hold et al. |
| 4,679,498 A | 7/1987 | Chaveron et al. |
| 4,802,769 A | 2/1989 | Tanaka |
| 4,818,113 A | 4/1989 | Patel |
| 4,846,054 A | 7/1989 | Mange et al. |
| 4,902,455 A | 2/1990 | Wobbe |
| 4,940,329 A | 7/1990 | Dienst |
| 5,125,824 A | 6/1992 | Schaarschmidt |
| 5,158,725 A | 10/1992 | Handa et al. |
| 5,259,670 A | 11/1993 | Brown |
| 5,306,452 A | 4/1994 | Todd |
| 5,335,991 A | 8/1994 | Wobbe |
| 5,358,327 A | 10/1994 | Derezinski et al. |
| 5,358,693 A | 10/1994 | Brinkmann et al. |
| 5,525,281 A | 6/1996 | Lorcks et al. |
| 5,626,420 A | 5/1997 | Deal et al. |
| 5,672,005 A | 9/1997 | Fukui et al. |
| 5,711,904 A | 1/1998 | Eswaran et al. |
| 5,800,055 A | 9/1998 | Sato |
| 5,851,065 A | 12/1998 | Ikeda et al. |
| 5,872,164 A | 2/1999 | Koide et al. |
| 6,129,873 A | 10/2000 | Shelby et al. |
| 6,165,399 A | 12/2000 | Guntherberg et al. |
| 6,312,148 B1 | 11/2001 | Deal et al. |
| 6,890,091 B2 | 5/2005 | Murakami et al. |
| 7,004,616 B2 | 2/2006 | Murakami et al. |
| 7,244,060 B2 | 7/2007 | Inoue et al. |
| 7,771,111 B2* | 8/2010 | Hoang ............................ 366/318 |
| 7,785,094 B1* | 8/2010 | Kearns et al. ................. 425/204 |
| 7,789,550 B2* | 9/2010 | Matthews et al. ............. 366/101 |
| 7,789,645 B2* | 9/2010 | Dubey et al. ................... 425/115 |
| 7,790,079 B2* | 9/2010 | Hoess et al. ................... 264/211 |
| 7,802,915 B2* | 9/2010 | Yamada et al. ................. 366/80 |
| 7,810,986 B2* | 10/2010 | Landers et al. ............. 366/76.91 |
| 7,811,075 B2* | 10/2010 | Shimada ......................... 425/208 |
| 7,828,538 B2* | 11/2010 | Fellinger .......................... 425/67 |
| 7,837,378 B2* | 11/2010 | Khoshnevis ..................... 366/78 |
| 7,842,221 B2* | 11/2010 | Magni et al. ................... 264/322 |
| 7,857,499 B2* | 12/2010 | Nicolas et al. .................. 366/83 |
| 7,857,500 B2* | 12/2010 | Morin et al. ................. 366/152.1 |
| 7,866,876 B2* | 1/2011 | Schulz ............................. 366/75 |
| 7,893,307 B2* | 2/2011 | Smith ............................ 585/241 |
| 7,896,638 B2* | 3/2011 | Morimoto ..................... 425/209 |
| 7,897,083 B2* | 3/2011 | Fukatsu et al. .............. 264/211.21 |
| 7,909,500 B2* | 3/2011 | Grutter et al. ..................... 366/78 |
| 7,910,030 B2* | 3/2011 | Remon et al. ................... 264/118 |
| 7,918,662 B2* | 4/2011 | Sawa ................................ 425/205 |
| 7,935,417 B2* | 5/2011 | Shimizu et al. ................. 428/323 |
| 7,954,991 B2* | 6/2011 | Martin et al. ................. 366/76.7 |
| 7,963,214 B1* | 6/2011 | Wenger et al. .................... 99/348 |
| 7,967,905 B2* | 6/2011 | Swann et al. ............... 106/281.1 |
| 7,975,833 B2* | 7/2011 | Jonczyk et al. ................. 198/669 |
| 7,981,340 B2* | 7/2011 | Sturm et al. ................ 264/211.23 |
| 7,993,122 B2* | 8/2011 | Bowen ............................ 425/113 |
| 7,998,514 B2* | 8/2011 | Backus et al. .................. 426/389 |
| 8,011,823 B2* | 9/2011 | Suzuki ............................. 366/77 |
| 2002/0186612 A1 | 12/2002 | Murakami et al. |
| 2003/0090955 A1 | 5/2003 | Murakami et al. |
| 2005/0127560 A1 | 6/2005 | Murakami et al. |
| 2006/0034147 A1 | 2/2006 | Murakami et al. |
| 2010/0193988 A1* | 8/2010 | Carloff et al. ................... 264/102 |
| 2010/0230852 A1* | 9/2010 | Brown ............................ 264/211 |
| 2010/0238759 A1* | 9/2010 | Pohl .................................. 366/81 |
| 2010/0260882 A1* | 10/2010 | Kearns et al. .................. 425/209 |
| 2010/0271900 A1* | 10/2010 | Fisson et al. ................. 366/76.9 |
| 2010/0271901 A1* | 10/2010 | Yamaguchi et al. ............ 366/79 |
| 2010/0284236 A1* | 11/2010 | Franz et al. ...................... 366/75 |
| 2010/0284237 A1* | 11/2010 | Takemoto et al. .............. 366/85 |
| 2010/0296360 A1* | 11/2010 | Inagawa et al. ................. 366/83 |
| 2010/0296361 A1* | 11/2010 | Brown ............................. 366/84 |
| 2010/0309745 A1* | 12/2010 | Yamada et al. .................. 366/89 |
| 2010/0310700 A1* | 12/2010 | Schulz ............................ 425/209 |
| 2010/0317769 A1* | 12/2010 | Graf et al. ......................... 524/1 |
| 2011/0007598 A1* | 1/2011 | Samann ........................... 366/82 |
| 2011/0042841 A1* | 2/2011 | Wildi et al. ....................... 264/13 |
| 2011/0042853 A1* | 2/2011 | Huang ....................... 264/328.1 |
| 2011/0051544 A1* | 3/2011 | Lekner et al. ................ 366/76.5 |
| 2011/0051545 A1* | 3/2011 | Fujimoto et al. ................. 366/83 |
| 2011/0059198 A1* | 3/2011 | Wehrle et al. .................. 425/206 |
| 2011/0060094 A1* | 3/2011 | Okubo ............................ 524/505 |
| 2011/0063939 A1* | 3/2011 | Padmanabhan ................. 366/79 |
| 2011/0063940 A1* | 3/2011 | Padmanabhan ................. 366/82 |
| 2011/0069576 A1* | 3/2011 | Padmanabhan et al. ........ 366/89 |
| 2011/0076350 A1* | 3/2011 | Khoshnevis .................. 425/204 |
| 2011/0082244 A1* | 4/2011 | Iizuka et al. ................... 524/322 |
| 2011/0085407 A1* | 4/2011 | Matsuda et al. ................ 366/75 |
| 2011/0085408 A1* | 4/2011 | Neubauer ........................ 366/77 |
| 2011/0091627 A1* | 4/2011 | Wenger et al. ................ 426/510 |
| 2011/0096617 A1* | 4/2011 | Bierdel et al. ................... 366/84 |
| 2011/0110178 A1* | 5/2011 | Bottomley et al. ............. 366/86 |
| 2011/0112255 A1* | 5/2011 | Bierdel .......................... 525/316 |
| 2011/0128812 A1* | 6/2011 | Eckart et al. .................... 366/84 |
| 2011/0133355 A1* | 6/2011 | Takita et al. ..................... 264/49 |
| 2011/0146883 A1* | 6/2011 | Burg .......................... 156/110.1 |
| 2011/0158034 A1* | 6/2011 | Schneider ........................ 366/90 |
| 2011/0160381 A1* | 6/2011 | Konig et al. ................... 524/508 |
| 2011/0170369 A1* | 7/2011 | Ek et al. ....................... 366/76.4 |
| 2011/0172318 A1* | 7/2011 | Favata ............................. 521/48 |
| 2011/0180949 A1* | 7/2011 | Bierdel et al. ................... 264/70 |
| 2011/0182132 A1* | 7/2011 | Lechner et al. .............. 366/76.6 |
| 2011/0182133 A1* | 7/2011 | Padmanabhan .............. 366/76.6 |
| 2011/0184089 A1* | 7/2011 | Bierdel et al. ................. 523/348 |
| 2011/0188336 A1* | 8/2011 | Carloff et al. ................... 366/75 |
| 2011/0194372 A1* | 8/2011 | Muhlthaler .................. 366/76.2 |
| 2011/0292755 A1* | 12/2011 | Murakami et al. .............. 366/75 |

FOREIGN PATENT DOCUMENTS

| | | |
|---|---|---|
| DE | 2 311 241 | 9/1974 |
| DE | 100 50 295 | 4/2002 |
| EP | 0 465 773 | 1/1992 |
| EP | 0 512 303 | 11/1992 |
| GB | 1 399 222 | 6/1975 |
| JP | 54-41962 | 4/1979 |
| JP | 4-14412 | 1/1992 |
| JP | 6-198652 | 7/1994 |
| JP | 6-238656 | 8/1994 |
| JP | 7-227845 | 8/1995 |
| JP | 7-233275 | 9/1995 |
| JP | 8-108430 | 4/1996 |
| JP | 11-262945 | 9/1999 |
| JP | 2000-43032 | 2/2000 |

* cited by examiner

KNEADING APPARATUS AND METHOD FOR KNEADING RUBBER-BASED COMPOSITION USING THE SAME

The present application is a continuation of U.S. application Ser. No. 11/249,633, filed on Oct. 14, 2005 and now abandoned, which is a continuation of U.S. application Ser. No. 10/123,253, filed on Apr. 17, 2002 now U.S. Pat. No. 7,004,616, which claims priority under 35 U.S.C. §119 to Japanese application 2001-127684, filed on Apr. 25, 2001, the contents of which are hereby incorporated by reference in their entirety.

BACKGROUND OF THE INVENTION

1. Field of the Invention

The present invention relates to kneading apparatuses. More particularly, the invention relates to a kneading apparatus used for masticating rubber and for kneading a rubber-based composition in which rubber and various compounding ingredients are mixed, and to a kneading method using the kneading apparatus.

2. Description of the Related Art

In order to produce a kneaded rubber-based composition including rubber and various compounding ingredients, a batch process is often used, in which predetermined amounts of raw materials are intermittently kneaded. However, in order to improve productivity, a method for continuously kneading a rubber-based composition has also been disclosed (Japanese Unexamined Patent Application Publication No. 11-262945). In such a method, a twin-screw extruder, which is a typical kneader for rubber-based compositions, is used. The twin-screw extruder is provided with a rubber feed port, and a rubber-feeding extruder is further connected thereto. Continuous kneading is performed by the twin-screw extruder while continuously feeding the rubber-based composition.

However, the continuous kneading method according to Japanese Unexamined Patent Application Publication No. 11-262945 is not suitable for rubber-based compositions having high viscosities, and as described in Example 1 in the patent application publication, the method aims to continuously knead a rubber-based composition having a low viscosity, e.g., a Mooney viscosity (100° C.) of approximately 47.

When a rubber-based composition having a high viscosity, e.g., a Mooney viscosity (100° C.) of more than 100, is kneaded, such as in the case of a composition in which natural rubber as a major ingredient and 30 parts or more of carbon are mixed, kneading treatment is performed to improve the dispersion of various compounding ingredients and also to decrease the viscosity of the rubber-based composition to a viscosity suitable for later processes, such as extrusion molding. The viscosity is decreased because rubber molecular chains are cut due to mechanical shearing. However, heat generation due to mechanical shearing forces applied to rubber increases as the viscosity is increased, and if the temperature becomes excessively high, the physical properties of the rubber are changed, thereby degrading the performance of the rubber. In general, if the temperature exceeds 160° C., the performance of the rubber is hindered. Because of the high viscosity of rubber, the cutting effect of molecular chains due to mechanical shearing is easily demonstrated when kneading is performed at lower temperatures, which is also advantageous in terms of kneading efficiency. In practice, when a rubber-based composition with a high viscosity is kneaded, it is extremely difficult to achieve a predetermined decrease in viscosity and a predetermined degree of dispersion of the compounding ingredients while the materials to be kneaded are maintained at low temperatures so as not to exceed the temperature range required to ensure the physical properties of the rubber. Therefore, kneading is performed by a batch-type kneader. When the temperature reaches approximately 160° C. during kneading, the materials to be kneaded are recovered from the kneader and cooled to ambient temperature after sheet forming is performed. Kneading is performed again in order to decrease the viscosity. Such a rekneading step is referred to as a remill step.

However, when a rubber-based composition having a high viscosity is kneaded by the method described above, the remill step is usually repeated several times until the predetermined viscosity is achieved. Remilling is often performed approximately five times. Consequently, the productivity inevitably decreases due to repeated kneading by the batch-type kneader and cooling, and since thermal hysteresis then takes place, alteration of the rubber easily occurs.

SUMMARY OF THE INVENTION

The objects of the present invention are to provide a kneading apparatus for rubber-based compositions having high viscosities in which continuous kneading treatment can be performed without repeated remilling, thus greatly improving productivity, and to provide a kneading method using the kneading apparatus.

In one aspect of the present invention, a kneading apparatus includes a barrel having a cylindrical chamber; a screw assembly rotating in the chamber so that a material to be kneaded is extruded in the axial direction by the rotation, the screw assembly including a screw section having helical blades and a kneading blade section in order to allow the material to be kneaded to flow into the clearance between the inner wall of the chamber and a kneading blade of the kneading blade section, and to apply shearing forces to the material to be kneaded; a metering feeder for feeding the material to be kneaded at a substantially constant volumetric rate or at a substantially constant gravimetric rate from a feed port provided on the barrel into the chamber; an injecting device provided on the barrel for injecting a heat-removing medium into the chamber; and a discharging device for separating the heat-removing medium which has been injected into the chamber by the injecting device and mixed with the material to be kneaded from the material to be kneaded, and discharging the heat-removing medium from the chamber.

In the structure described above, continuous kneading can be performed while feeding the material to be kneaded to the kneading extruder at a constant rate, and injection of the heat-removing medium into the chamber and the discharge of the heat-removing medium from the chamber can also be performed continuously. That is, the heat-removing medium removes heat while being mixed with and brought into sufficient contact with the material to be kneaded which generates heat due to kneading, and the heat-removing medium is discharged from the chamber. Therefore, heat-removing treatment of the material to be kneaded can be efficiently performed during kneading.

Accordingly, by using an apparatus having the structure described above, it is possible to perform kneading treatment in which the viscosity is decreased to a predetermined level without having a high-temperature state even when the material to be kneaded is a rubber-based composition and the heat-removing medium is water. That is, with respect to a rubber-based composition having a high viscosity, continuous kneading treatment can be performed without repeated remilling, resulting in a great improvement in productivity.

Additionally, in such a structure, since the positions and numbers of the injecting devices (injecting devices for heat-removing medium) and the discharging devices (discharging devices for heat-removing medium), as well as the amount of injection, can be selected in any given manner, it is possible to adjust the cooling capacity appropriately depending on the characteristics of the rubber-based composition and the kneading extruder.

For example, when a rubber-based composition is fed at a high temperature or when the temperature of a rubber-based composition is increased while being passed through the rubber metering feeder and the kneading effect is decreased, the rubber-based composition is brought into contact with injected water in the kneading extruder so that the rubber-based composition is cooled primarily by the sensible heat of the water, and the water used for cooling is discharged through the discharging device, such as a slit, provided on the barrel, and thus cooling of the rubber-based composition is accelerated, and then the rubber-based composition may be subjected to the subsequent kneading step.

Additionally, Japanese Unexamined Patent Application Publication No. 7-227845 discloses a batch-type kneader in which water is added when kneading is performed. The publication relates to a method for reutilizing unvulcanized foamed rubber used for tires which has failed to meet the standards with respect to the expansion rate, dimensional accuracy, etc., and a foaming agent is decomposed and eliminated by kneading the unvulcanized foamed rubber mixed with a small amount of water in a batch-type hermetically closed mixer. That is, there are differences in the problems to be solved and the features between the present invention and Japanese Unexamined Patent Application Publication No. 7-227845.

Preferably, in the kneading apparatus of the present invention described above, the discharging device for discharging the heat-removing medium includes a vacuum pump connected to the chamber for evacuating the chamber in the region in which the screw section is placed.

In such a structure, when water is used as the heat-removing medium, the water extruded together with the rubber-based composition to the screw section under reduced pressure is vaporized and sucked out by the vacuum pump, and just water Can be eliminated efficiently without discharging the material to be kneaded from the chamber. That is, when water is separated from the material to be kneaded, the water absorbs heat of vaporization from the material to be kneaded, and since the heat of vaporization of water is significantly larger than the temperature-raising heat of water, it is possible to provide an efficient cooling means with a small amount of water. Since water is removed from the material to be kneaded by vaporization, water does not substantially remain in the kneaded material, and thus a discharging device with satisfactory dewaterability can be provided. Since the screw section which is interposed between two kneading blade sections is evacuated, the sealing effect can be displayed due to the material to be kneaded which is loaded in the kneading blade sections, and it is possible to provide a reduced pressure space sufficient for vaporizing water.

Additionally, in the present invention, the heat-removing medium is not limited to water.

Preferably, in the kneading apparatus of the present invention described above, the discharging device for the heat-removing medium includes a slit formed in the barrel in the region in which the screw section placed.

In such a structure, even when water is used as the heat-removing medium and a large amount of cooling water is required, dewatering can be performed efficiently. A dewatering device can be produced with a simple construction. Even if the rubber-based composition to be fed into the kneading extruder is in a high temperature state, it is possible to cool the composition efficiently before kneading treatment is performed.

Preferably, the kneading apparatus of the present invention further includes at least one gap-adjusting device provided at the outlet of the kneading blade section so as to sandwich the screw assembly, the gap-adjusting device being capable of adjusting a gap formed between the screw assembly and the gap-adjusting device.

In such a structure, by changing the gap at the outlet of the kneading blade section, i.e., by changing the area through which the material to be kneaded passes, the extruded material to be kneaded is squeezed and the flow resistance of the material to be kneaded is changed, and thus the material residence time in the kneading extruder can be adjusted. That is, it is possible to adjust the filling factor of the material to be kneaded in the kneading blade section, and desired kneading conditions can be easily adjusted.

Preferably, in the kneading apparatus of the present invention described above, the metering feeder is either a gear pump or a screw extruder connected to the feed port provided on the barrel.

In such a structure, by using the gear pump or screw extruder as the metering feeder, it is possible to stably feed the material to be kneaded to the kneading extruder at a constant rate. Thereby, variations in the quality of the kneaded product can be suppressed. The form of the material to be kneaded is not particularly limited, and various forms, such as blocks, veils, sheets, and ribbons, may be selected.

Preferably, the kneading apparatus of the present invention further includes a temperature-measuring section for measuring the temperature of the material to be kneaded in the chamber, and a control section for controlling the amount of the heat-removing medium to be injected into the chamber or the speed of rotation of the screw assembly based on the measured temperature.

In such a structure, it is possible to change the driving conditions and the cooling conditions of the kneading extruder depending on the temperature of the material to be kneaded during kneading. That is, although the heat-generating state always changes during kneading, it is possible to change the cooling conditions and the speed of rotation appropriately so that the optimum kneading conditions can be achieved.

In another aspect of the present invention, a method for kneading a rubber-based composition including rubber and compounding ingredients using the kneading apparatus described above includes: a feeding step of feeding the rubber-based composition into the chamber at a substantially constant volumetric rate or at a substantially constant gravimetric rate by the metering feeder; a kneading step of allowing the rubber-based composition to flow into the clearance between the inner wall of the chamber and the kneading blade section and moving the rubber-based composition in the chamber while mixing and dispersing the rubber-based composition by means of shearing forces; a mixing step of injecting a heat-removing medium into the chamber by the injecting device and mixing the rubber-based composition with the heat-removing medium before or during kneading; and a discharging step of separating the heat-removing medium which has been injected into the chamber by the injecting device and mixed with the rubber-based composition from the rubber-based composition and discharging the heat-removing medium by the discharging device.

In such a method, a rubber-based composition can be continuously kneaded by the kneading extruder and heat removal can be simultaneously performed during kneading. Consequently, even in the case of a rubber-based composition having a high viscosity, kneading treatment can be performed so that the viscosity is decreased to a predetermined level without having a high temperature state. That is, a rubber-based composition having a high viscosity can be continuously kneaded without repeated remilling, resulting in a great improvement in productivity.

DESCRIPTION OF THE PREFERRED EMBODIMENTS

Figure 1:
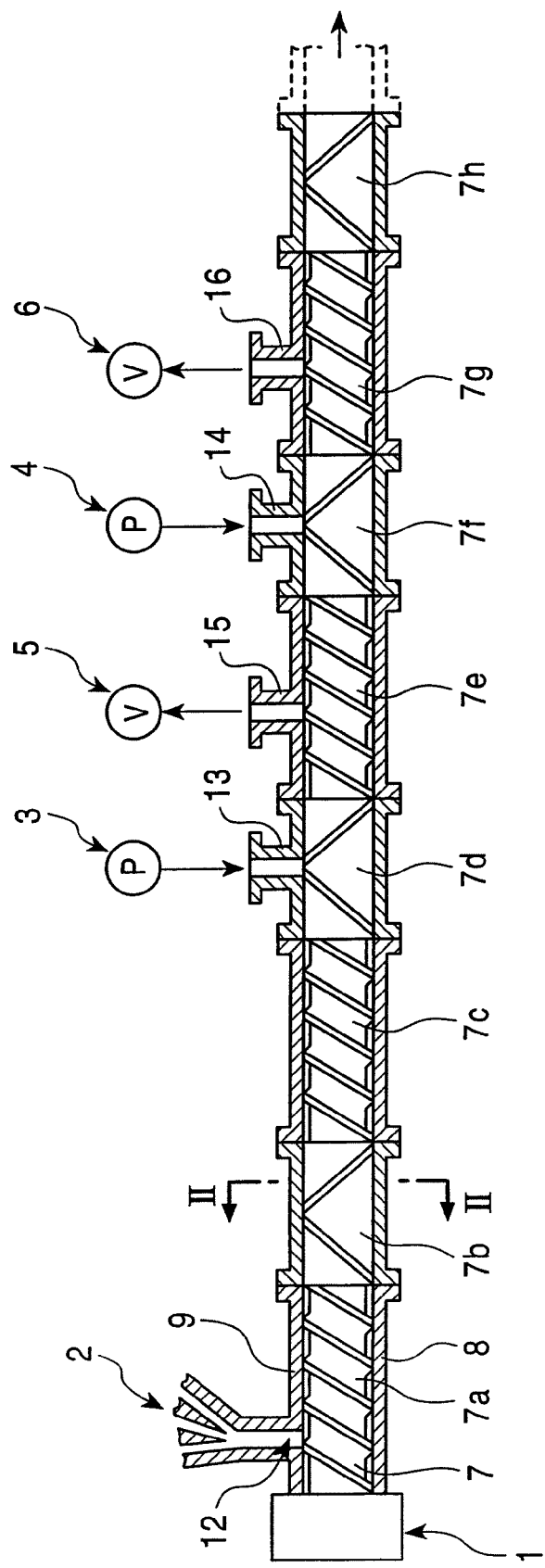
FIG. 1 is a schematic sectional view of a kneading apparatus for rubber-based compositions, viewed from a side, in a first embodiment of the present invention.

A first embodiment of the present invention will be described with reference to FIG. 1. FIG. 1 is a schematic sectional view of a kneading apparatus for rubber-based compositions, viewed from a side, in this embodiment. The kneading apparatus includes a co-rotating intermeshing twin-screw kneading extruder 1. A rubber metering feeder 2 is connected to the twin-screw kneading extruder 1, and injection pumps 3 and 4 constituting injecting devices and vacuum pumps 5 and 6 constituting discharging devices are also connected thereto. The front end of the twin-screw kneading extruder 1 is exposed to air, and the rubber-based composition is discharged as a lump.

The twin-screw kneading extruder 1 includes a screw assembly 7 composed of a pair of screws, and a barrel 9 including a cylindrical chamber 8 in which the screws rotate. The shafts of the screws are parallel to each other and completely overlap in the side view shown in FIG. 1. A material to be kneaded is extruded in the axial direction by the rotation of each screw. The screw assembly 7 alternately includes screw sections 7a (first), 7c (second), 7e (third), and 7g (fourth) having helical blades and kneading blade sections 7b (first), 7d (second), 7f (third), and 7h (fourth) for allowing the material to be kneaded to flow in the clearance between the inner wall of the chamber 8 and the kneading blade sections and for applying shearing forces to the material to be kneaded. Both screws are connected to a driving device (not shown in the drawing) and are rotated by the driving device.

The helical blades in each screw section are formed along the peripheries of the individual screw shafts so as to extend in the axial direction. The tops of the helical blades are positioned at the same distance from the centers of the shafts of the screws. The pair of screws having the helical blades formed in the same direction rotate in the same direction, and thereby the material to be kneaded is moved rightward in FIG. 1. The helical pitches of the helical blades provided in the screw sections are not necessarily the same, and the helical blades may have densely pitched areas and sparsely pitched areas. For example, as will be described below, when water is injected for cooling the material to be kneaded, the helical blades located downstream in the extrusion process may be densely pitched so that the material to be kneaded is subjected to a filling and compressing action, thus providing a dewatering function. When a portion of the chamber 8 is evacuated by suction, the helical blades located in the areas adjacent to the space to be evacuated by suction may be densely pitched, or helical blades or sheets effective in blocking the material to be kneaded may be placed so that the areas adjacent to the space to be evacuated by suction are filled with the material to be kneaded, thereby displaying a sealing effect. Alternatively, reverse flighted screws, which are helical blades formed in the opposite direction, may be partially provided, or rotors or kneading disks as return segments (L segments) in which blades in the opposite direction are formed may be partially provided so that the filling factor of the material to be kneaded is increased, thereby producing a pressurized state.

Figure 2:
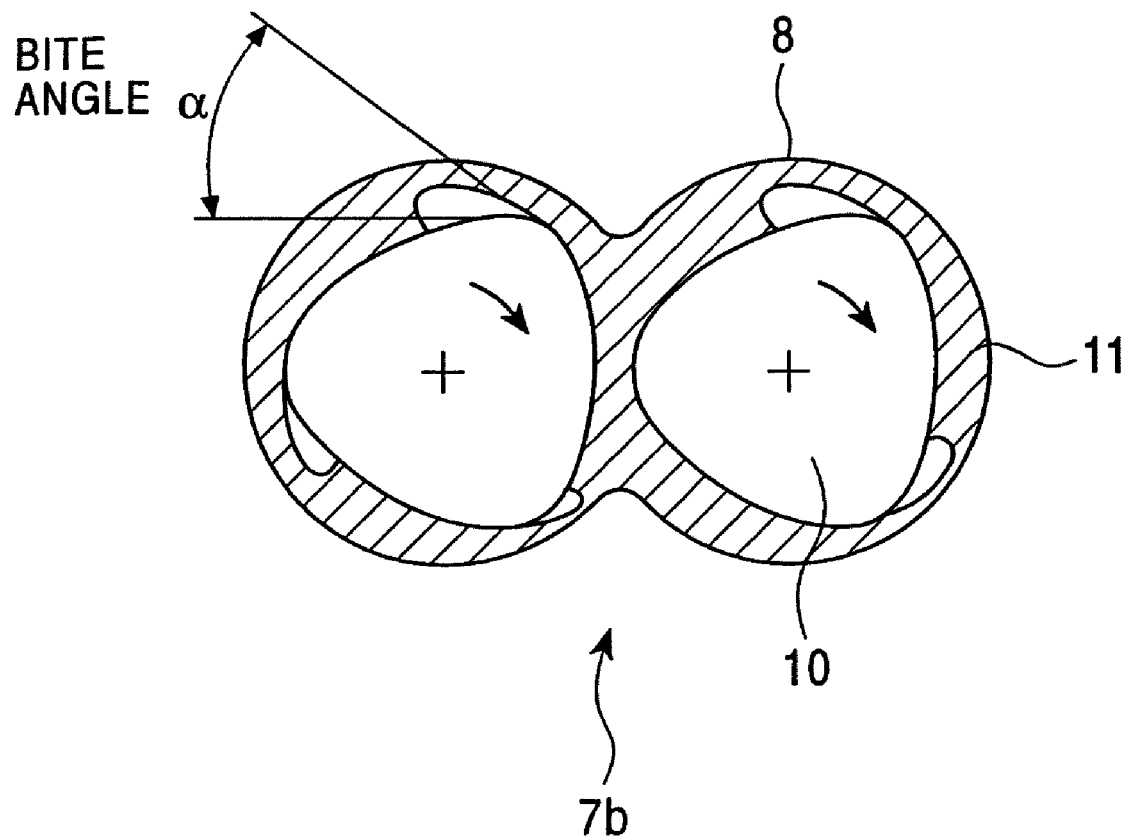
FIG. 2 is a sectional view taken along the line II-II of FIG. 1.

In each kneading blade section placed between the screw sections, three kneading blades are provided along the periphery of each screw with an angle of 120° therebetween, each kneading blade having a cross section suitable for kneading, i.e., having a shape such that a bite angle to the material to be kneaded is created. Each kneading blade is helically and slowly wound about the screw shaft extending in the axial direction. At the midpoint of each kneading blade section, the helical direction is reversed. Herein, the helical direction of the kneading blades located upstream in the extrusion process is defined as a normal direction and the helical direction of the kneading blades located downstream is defined as an opposite direction. The materials to be kneaded are transported to the kneading blade section composed of the kneading blades having the normal and opposite helical directions fill the kneading blade section to await kneading. Kneading is performed so that the material to be kneaded is made to flow between the kneading blades of both screws and between the kneading blades having the normal helical direction and the kneading blades having the opposite helical direction. FIG. 2 is a sectional view taken along the line II-II of FIG. 1. FIG. 2 shows the state in which a material 11 to be kneaded is kneaded in the clearance between the inner wall of the chamber 8 and the kneading blades 10. Three chip kneading blades 10 are provided along the periphery of each screw shaft with an angle of 120° therebetween and with a bite angle α. Additionally, the midpoint in which the helical direction is reversed is not necessarily located in the exact middle of the kneading blade section, and the midpoint may be placed in the downstream side in the extrusion process so as to accelerate the transport of the material to be kneaded.

With respect to the structure of the chamber 8, as shown in FIG. 2, two cylindrical passages in which a pair of screws rotate are placed in parallel and are connected to each other. The barrel 9 is constructed so as to form the chamber 8. The barrel 9 is composed of detachable units, each unit being a screw section or a kneading blade section. This is because the barrel 9 is designed so that various combinations of the screw sections and the kneading blade sections can be selected or the numbers of the injecting devices and the discharging devices can be appropriately selected.

Additionally, a cooling jacket for passing a cooling medium may be internally or externally provided on at least one unit constituting the barrel 9.

A rubber feed port 12 for feeding a rubber-based composition into the chamber 8 is provided on the first screw section 7a located upstream in the twin-screw kneading extruder 1. As shown in FIG. 1, the rubber metering feeder 2 having a twin screw extruding device is connected to the rubber feed port 12. The raw materials of a rubber-based composition are continuously fed into the chamber 8 by the twin-screw extruding device. The rubber metering feeder 2 allows continuous feed of the raw material rubber at a constant rate regardless of the form of the raw material rubber, i.e., the raw material rubber may be in the form of powder or in a lump. Additionally, the rubber metering feeder 2 does not necessarily include a twin-screw extruding device, and the rubber metering feeder 2 may include a single-screw extruding device, a multi-screw extruding device having more than three screws, or a gear pump. In either case, continuous feed can be performed at a constant rate regardless of the form of the raw material rubber.

In the twin-screw kneading extruder 1, the injection pumps 3 and 4 are connected to injection ports 13 and 14 provided on the barrel at the positions where the second kneading blade section 7d and the third kneading blade section 7f are placed, respectively. These elements constitute the injecting devices. Water sent from the injection pumps 3 and 4 is injected into the chamber 8 through the injection ports 13 and 14, and the material to be kneaded and the water are mixed together. Thereby, heat generated from the material to be kneaded can be removed.

The vacuum pumps 5 and 6 are connected to suction ports 15 and 16 provided on the barrel at the positions where the third screw section 7e and the fourth screw section 7g are placed, respectively. The chamber 8 can be evacuated by suction in the regions where the third screw section 7e and the fourth screw section 7g are placed by the vacuum pumps 5 and 6. Since the pressure is reduced as described above, water injected in the second screw section 7d and the third screw section 7f and contained in the material to be kneaded is vaporized and is sucked out by the vacuum pumps 5 and 6.

An injecting device is provided in the second kneading blade section 7d first because a high-temperature state which requires cooling is not brought about in the first kneading blade section 7b and because it may be necessary to accelerate the heat generation of the rubber-based material to a certain extent so that the rubber-based material is plasticized and the sealing effect is displayed in order to remove water under vacuum in the downstream process. In the fourth kneading blade section 7h in the last stage, an injecting device is not provided because it is not possible to perform dewatering by vacuum in the downstream side. In the meantime, when a rubber-based composition fed into the twin-screw kneading extruder 1 has a high temperature, since the rubber-based composition can display the sealing effect in the first kneading blade section 7b, it is possible to inject water in the first kneading blade section 7b and to evacuate by suction in the unit between the first kneading blade section 7b and the second kneading blade section 7d.

Moreover, when a cooling jacket for passing a cooling medium is provided, since indirect cooling is performed in addition to direct cooling by the injection of water, the removal of heat can be more effectively performed from a material to be kneaded which generates heat.

Additionally, the numbers of the kneading blade sections and the screw sections are not limited to this embodiment, and are preferably selected appropriately depending on the quality of the rubber-based composition to be processed and the desired decreased value of viscosity. The numbers and positions of the injecting devices and the discharging devices are also not limited to this embodiment.

Next, the operation of the kneading apparatus for rubber-based compositions in the first embodiment of the present invention will be described step by step in the process of producing a kneaded rubber-based composition. First, raw materials for a rubber-based composition including a filler, such as carbon black, and various compounding ingredients in various forms of powder, lump, or sheet are fed into the rubber metering feeder 2. The raw material rubber fed into the rubber metering feeder 2 is transported to the feed port 12 of the twin-screw kneading extruder 1 at a constant rate by the twin-screw extruding device constituting the rubber metering feeder 2.

The raw material rubber fed into the twin-screw kneading extruder 1 at a constant rate through the feed port 12 is delivered to the chamber 8 at the position where the first screw section 7a is located. At this stage, the screw assembly 7 (a pair of screws) is already being rotated by a driving device (not shown in the drawing). The rubber-based composition as the material to be kneaded is extruded to the first kneading blade section 7b by the rotating helical blades of the screw section 7a. In the first kneading blade section 7b, the material to be kneaded starts to fill between the inner wall of the chamber 8 and the kneading blades, and the material to be kneaded is made to flow and is mixed and dispersed in the clearance between the inner wall of the chamber 8 and the kneading blades while being applied with shearing forces, and thus kneading is performed.

The material kneaded in the first kneading blade section 7b moves to the second screw section 7c by being extruded by the material filling the upstream side. The material moved to the second screw section 7c is transported to the second kneading blade section 7d by the rotation of the helical blades.

The material transported to the second kneading blade section 7d is kneaded again in the same manner as the first kneading blade section 7b apart from the fact that water sent from the injection pump 3 is injected into the second kneading blade section 7d through the injection port 13. Consequently, the material to be kneaded is brought into contact with water during kneading. At this stage, the temperature of the material to be kneaded is increased to a certain extent due to the heat generation during kneading in the first kneading blade section 7b, and the temperature is further increased because heat generation occurs during kneading in the second kneading blade section 7d. However, since the water injected is mixed with the material to be kneaded and is brought into sufficient contact with the material to be kneaded, heat can be removed from the material to be kneaded.

The material to be kneaded thus cooled by the injection of water is extruded to the third screw section 7e by the material moved from the upstream side into the second kneading blade section 7d. In the third screw section 7e, the material to be kneaded is transported in the same manner as the upstream screw section apart from the fact that the atmospheric gas in the chamber 8 is sucked out by the vacuum pump 5 through the suction port 15 and a reduced-pressure space is produced. At this stage, the materials filled in the adjacent kneading blade sections display the sealing effect to secure the reduced-pressure space. Alternatively, as described above, the helical blades in the upstream end and the downstream end in the third screw section 7e may be densely pitched in the axial direction and the helical blades at the position corresponding to the suction port 15 may be sparsely pitched so that the material to be kneaded fills the densely pitched area, thereby displaying the sealing effect.

Since the chamber 8 in which the third screw section 7e is evacuated as described above, vaporization and evaporation of the water contained in the material to be kneaded are accelerated. Since heat of vaporization of water is large, it is possible to efficiently remove heat from the material to be kneaded with the addition of a small amount of water. Accordingly, just water used for cooling is separated and dewatering is appropriately performed, and also both absorption of heat by water and removal of heat by vaporization are performed, and thereby cooling can be performed efficiently.

The material to be kneaded in which water is removed in the third screw section 7e is transported to the third kneading blade section 7f. In the third kneading blade section 7f, kneading is performed while injecting water again for cooling in the same manner as the second kneading blade section 7d. Furthermore, in the fourth screw section 7g, water is removed in the same manner as the third screw section 7e. The material to be kneaded is then transported to the fourth kneading blade section 7h which is the final stage, and just kneading is performed therein, and then the material is extruded as a lump from the front end into the air.

It is to be understood that the embodiment described above also covers the method for kneading rubber-based compositions in accordance with the present invention.

Figure 3:
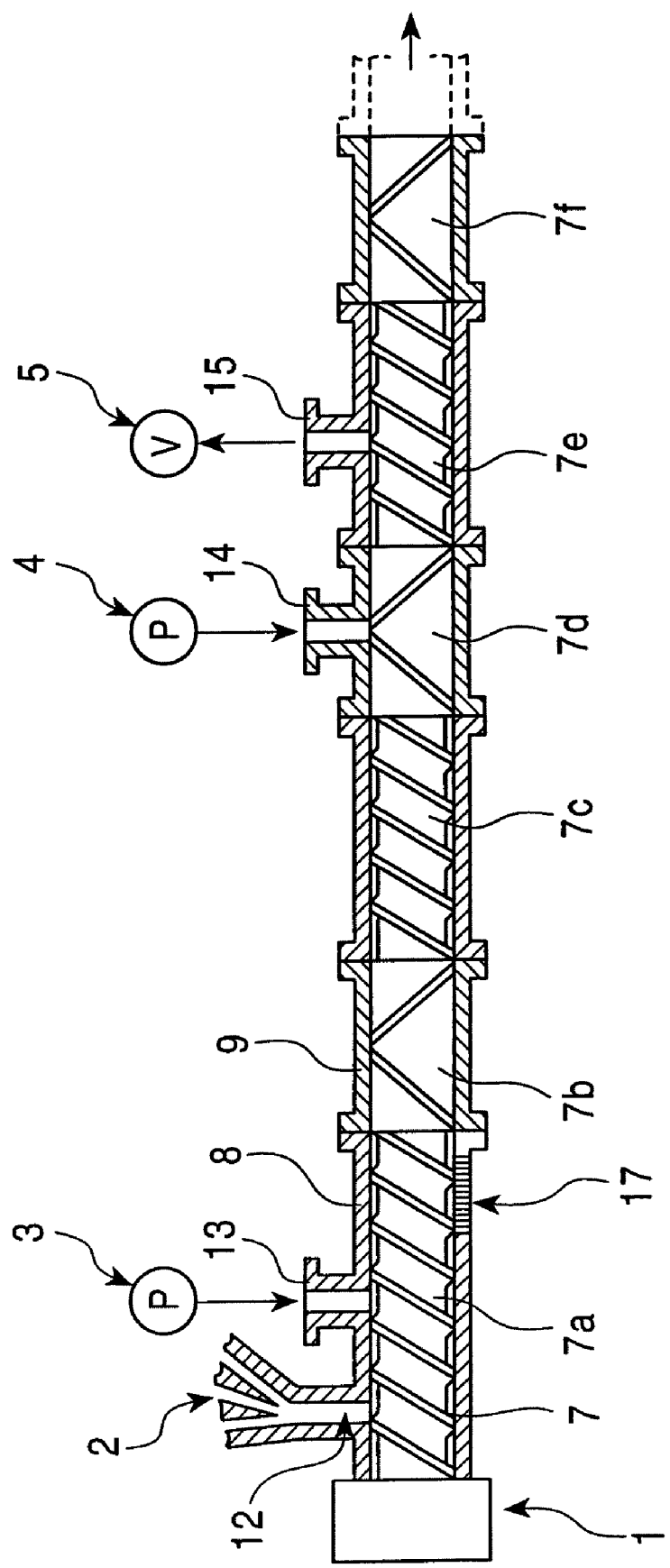
FIG. 3 is a schematic sectional view of a kneading apparatus for rubber-based compositions, viewed from a side, in a second embodiment of the present invention.

A kneading apparatus for rubber-based compositions in a second embodiment of the present invention will now be described. FIG. 3 is a schematic sectional view of the kneading apparatus in this embodiment. As shown in FIG. 3, the kneading apparatus includes a twin-screw kneading extruder 1, and a rubber metering feeder 2, injection pumps 3 and 4, and a vacuum pump 5 connected to the twin-screw kneading extruder 1. The twin-screw kneading extruder 1 includes a screw assembly 7, a chamber 8, and a barrel 9. The screw assembly 7 has three screw sections and three kneading blade sections which are placed alternately. In the second embodiment, the injection pumps 3 and 4 are connected to a first screw section 7a and a second kneading blade section 7d through injection ports 13 and 14, respectively, and the injection pump 5 is connected to a third screw section 7e through a suction port 15. The barrel in the region where the first screw section 7a is located is provided with a slit portion 17. In the slit portion 17, slits are formed so as to connect the interior of the chamber 8 to the exterior of the chamber 8.

The kneading apparatus in this embodiment has a structure which is effective in kneading high-temperature raw material rubber directly by the twin-screw kneading extruder. The characteristic operation of the kneading apparatus will be described below.

For example, a rubber-based composition which has been kneaded to a certain extent by a batch-type mixer or the like and which has a high temperature is fed into the rubber metering feeder 2. This process is performed, for example, when there is a difficulty in feeding at a constant rate unless the raw material rubber is heated to a temperature that allows plasticization, or in order to omit the step of cooling high temperature rubber. The fed material to be kneaded is transported to the downstream side by the first screw section 7a, and at this stage water is injected from the injection pump 3 into the chamber 8 through the injection port 13. Thereby, the high temperature material to be kneaded being transported is brought into contact with water and cooled. The water which comes into contact with water and absorbs heat flows in the chamber 8 and is discharged from the slit portion 17. By appropriately setting the width of slits in the slit portion 17, it is possible to just discharge water used for cooling without discharging the material to be kneaded from the chamber 8. Even when a large amount of cooling water is required, it is possible to efficiently remove the water, and a dewatering device can be produced with a simple construction.

Since the material to be kneaded cooled in the first screw section 7a is processed afterward in the same manner as the first embodiment, the description thereof will be omitted. The numbers of the screw sections and the kneading blade sections and the numbers of the injecting devices and the discharging devices are not limited to this embodiment and can be appropriately selected depending on the quality of the rubber-based composition to be processed, the desired reduction value of viscosity, etc.

Figure 4:
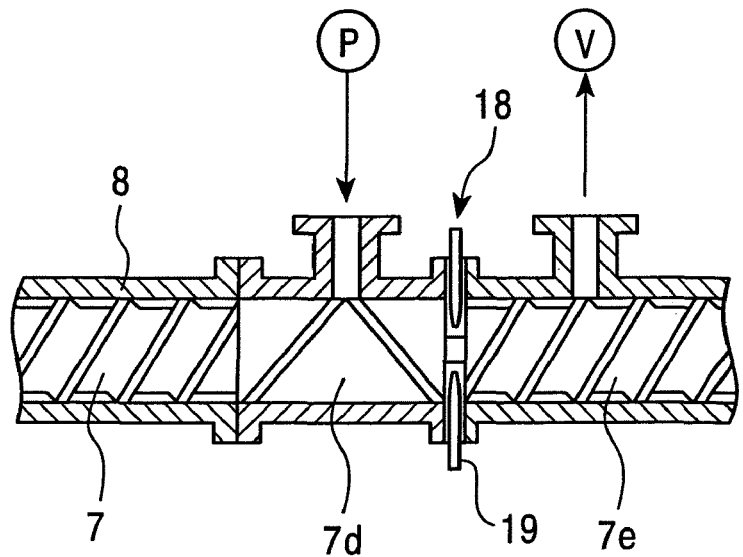
FIG. 4 is a schematic sectional view which shows a part of a kneading apparatus for rubber-based compositions in a third embodiment of the present invention.
Figure 5:
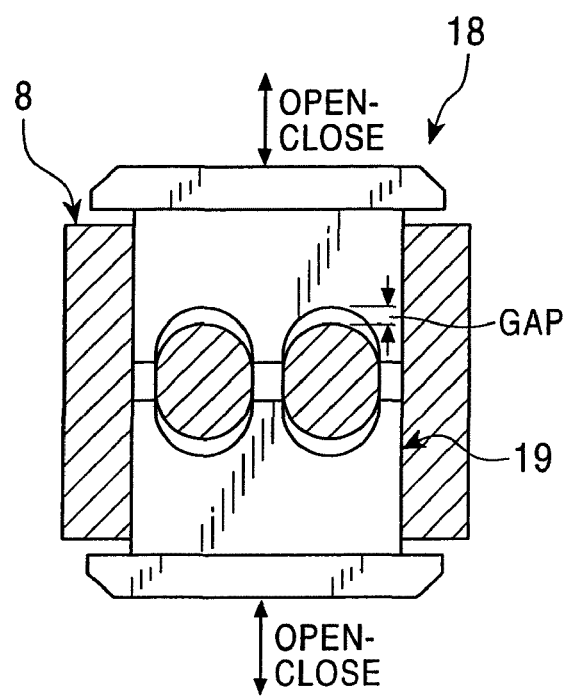
FIG. 5 is a schematic diagram of a gate device at a cross section perpendicular to the shafts of the screw assembly.

A kneading apparatus for rubber-based compositions in a third embodiment of the present invention will now be described. FIG. 4 is a schematic sectional view which shows a part of a kneading apparatus in the third embodiment of the present invention, taken along the shafts of a screw assembly 7. The kneading apparatus in this embodiment is the same as the first embodiment apart from the fact that a gate device 18, which is a gap-adjusting device, is provided between the second kneading blade section 7d and the third screw section 7e. FIG. 5 is a sectional view of the gate device 18, perpendicular to the shafts of the screw assembly 7. The gate device 18 includes two gates 19 located so as to sandwich the screw assembly 7, and the gates 19 are provided perpendicularly to the shafts of the screw assembly 7 and so as to be movable in relation to the screw assembly 7. Thereby, a gap formed between the screw assembly 7 and the gate 19, i.e., the area through which the material to be kneaded passes, can be adjusted. By changing the gap, the extruded material to be kneaded is squeezed and the flow resistance of the material to be kneaded is changed, and thus the material residence time in the kneading apparatus can be adjusted. That is, it is possible to adjust the filling factor of the material to be kneaded in the kneading blade section, and desired kneading conditions can be easily adjusted. Additionally, the gate device 18 is not limited to the example described above. Gate devices may be provided in a plurality of kneading blade sections and screw sections. A gate device may be composed of two gate rods sandwiching the screw assembly 7, each rotating without moving perpendicularly. A gate device may have a structure including a conical part provided on the screw assembly 7 and a slot formed between the conical part and the chamber, in which the chamber and the conical part are relatively moved in the axial direction of the screw assembly 7. Alternatively, a pin type gate device may be used, such as the one seen in a rubber extruder.

Figure 6:
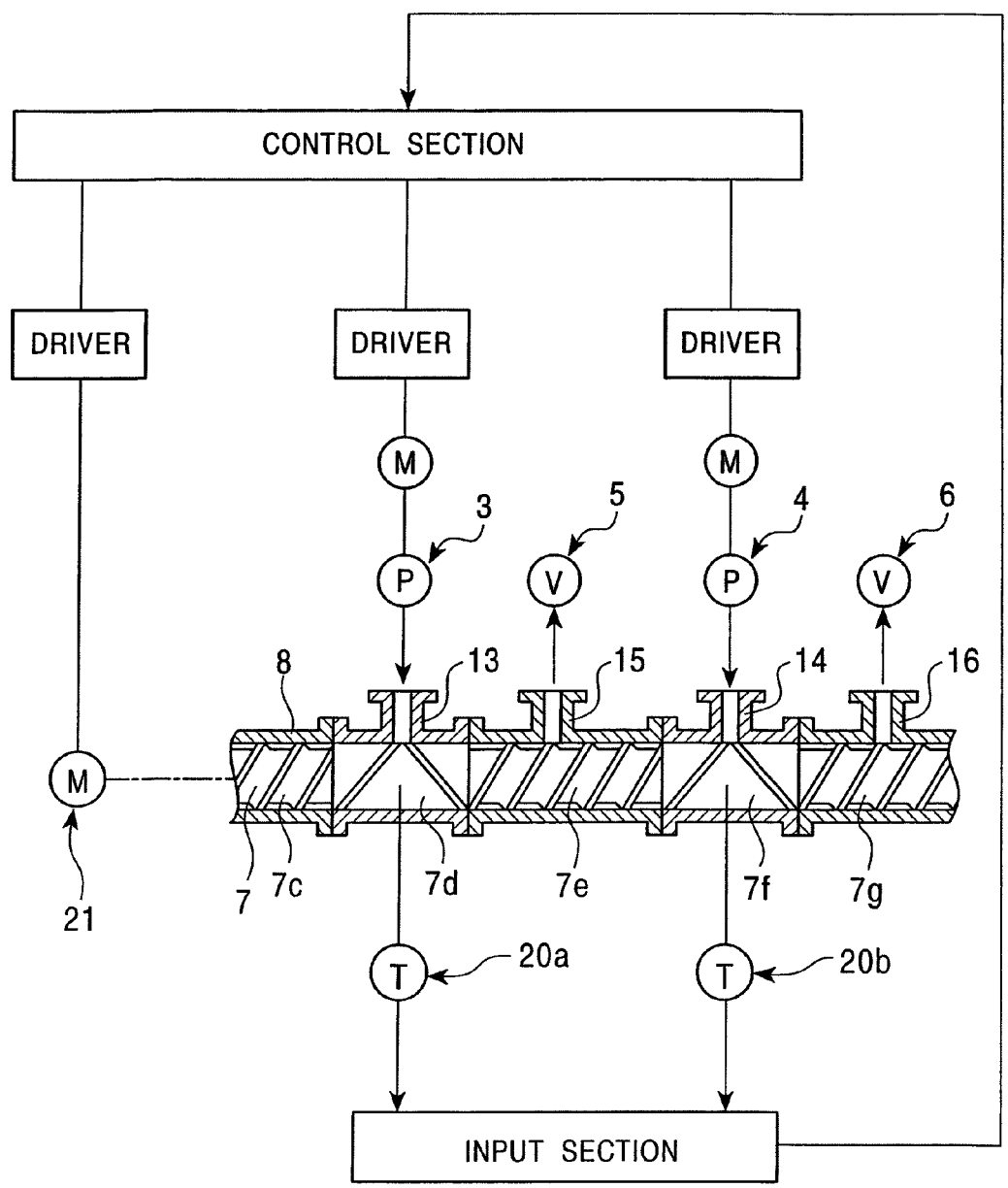
FIG. 6 is a schematic diagram showing a kneading apparatus for rubber-based compositions in a fourth embodiment of the present invention.

A kneading apparatus for rubber-based compositions in a fourth embodiment of the present invention will now be described. FIG. 6 is a schematic diagram showing a kneading apparatus in this embodiment. The kneading apparatus is the same as the first embodiment apart from the fact that temperature-measuring sections 20a and 20b for measuring the temperature of the material to be kneaded are provided in the second kneading blade section 7d and the third kneading blade section 7f. Furthermore, the kneading apparatus includes a control section for controlling the amount of water to be injected into the chamber 8 and the speed of rotation of the screw assembly 7 based on the temperatures measured, and an input section for transmitting the values measured by the temperature-measuring sections 20a and 20b.

If the speed of rotation of the screw assembly 7 is increased, the kneading power is increased. Therefore, high speed revolution is desirable in view of kneading efficiency. However, as the speed of revolution is increased, the amount of heat generated from the material to be kneaded is increased. The heat generated from the material to be kneaded varies depending on the type of rubber-based compositions to be kneaded, the viscosity of the material during kneading, etc. Therefore, the screw assembly 7 is desirably rotated as fast as possible while monitoring the heat-generating state and appropriately adjusting the cooling capability so that the temperature of the material to be kneaded is properly maintained.

In this embodiment, based on the temperatures measured in the knead blade sections 7d and 7f, the control section determines the amount of water injection necessary for keeping the material to be kneaded at a desired temperature, and the highest possible speed of rotation under the temperature and the amount of water injection, and the control section then prepares operational instructions for the injection pumps 3 and 4 as well as a driving motor 21 of the screw assembly 7. Following the operational instructions, the injection pumps 3 and 4 and the driving motor 21 are operated. Thereby, it is possible to achieve the fastest and most efficient kneading conditions in response to the heat-generating state which changes during kneading.

It is to be understood that the present invention is not limited to the individual embodiments described above. For example, the embodiments may be modified as follows.

(1) The rubber metering feeder does not necessarily include a screw extruding device or a gear pump. For example, as in a kneading apparatus for rubber-based compositions shown in FIG. 7, a device for feeding raw material rubber in the form of sheet or ribbon may be used, in which a sheet/ribbon rubber 23 as a raw material is directly fed to the feed port 12 from a sheet/ribbon stock 22 by a guide roller 24. When a directly connected rubber metering feeder, such as a screw extruding type, is used, if the temperature of the raw material rubber to be fed into the twin-screw kneading extruder is not increased sufficiently for plasticization, the constant feed accuracy is decreased, resulting in variations in the kneaded material. Therefore, when a directly connected rubber metering feeder is used, the raw material rubber must be heated to a certain extent, and as a result, with respect to the rubber fed into the twin-screw extruder which preferably has a low temperature, an increase in temperature to a certain extent is unavoidable. However, in accordance with the modified example described above, since it is possible to continuously feed the sheet/ribbon rubber 24 at a constant rate while keeping the low temperature, low temperature kneading is further ensured.

Figure 7:
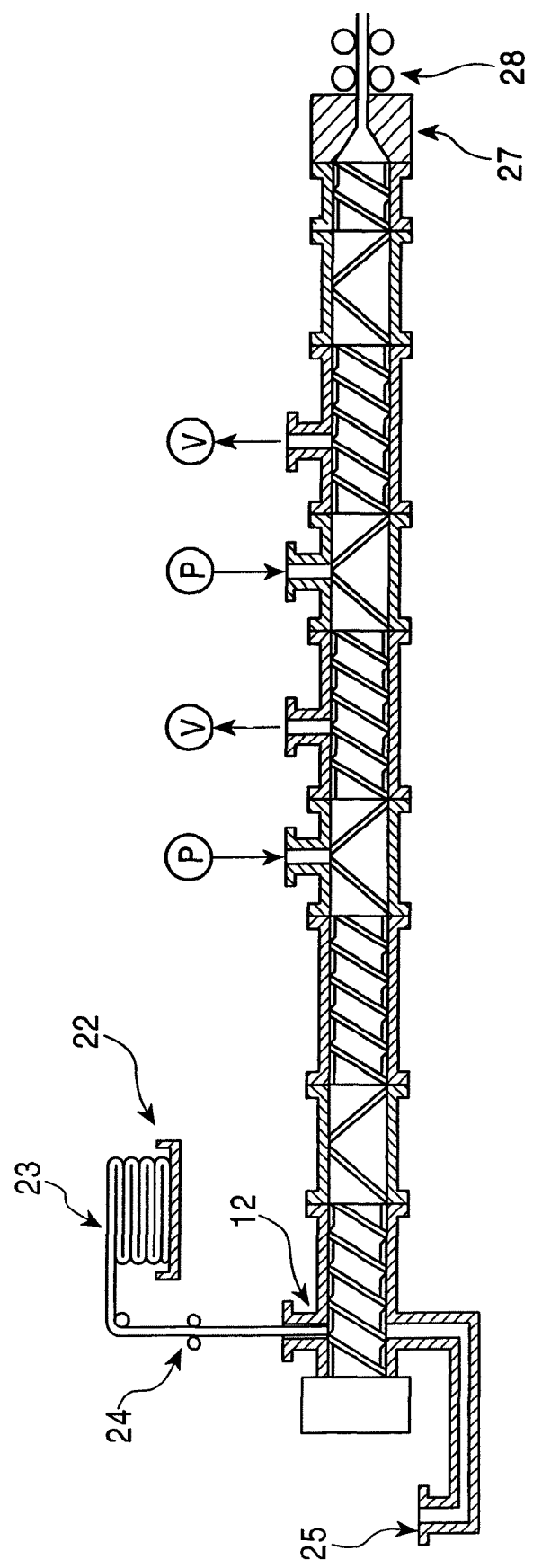
FIG. 7 is a schematic diagram showing a modified kneading apparatus for rubber-based compositions.
Figure 8:
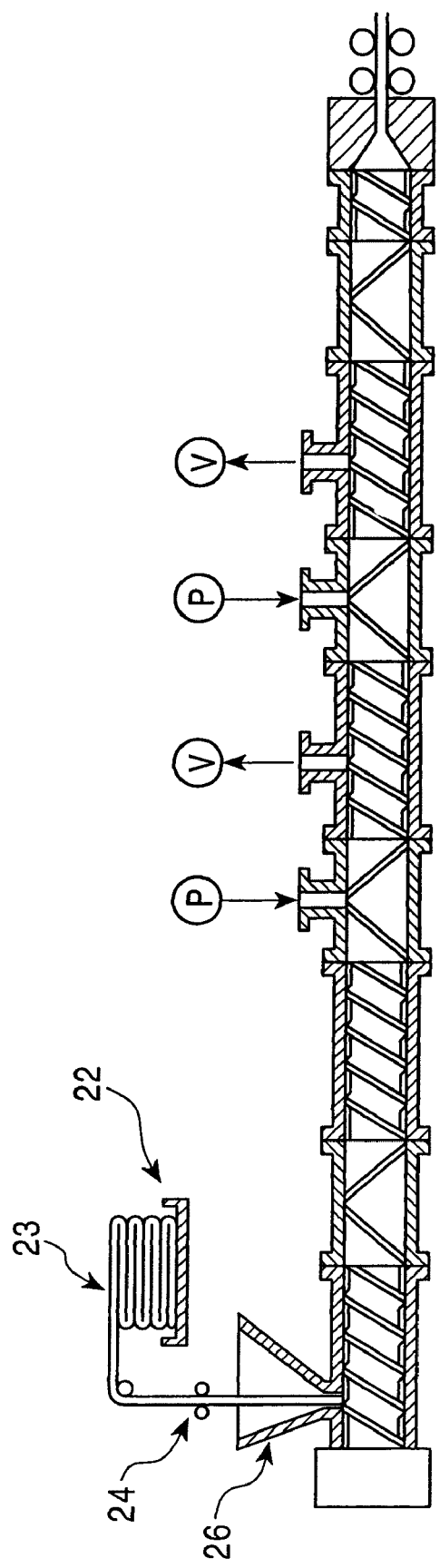
FIG. 8 is a schematic diagram showing another modified kneading apparatus for rubber-based compositions.

(2) Various compounding ingredients to be mixed with raw material rubber are added to and mixed with the raw material rubber by a batch-type kneader before being kneaded in the kneading apparatus for rubber-based compositions. However, as shown in FIG. 7, a feed port 25 for feeding various liquid compounding ingredients directly into the barrel into which raw material rubber is fed may be provided. Thereby, it is possible to knead various compounding ingredients by the twin-screw kneading extruder while feeding the compounding ingredients simultaneously with raw material rubber without preliminarily mixing the compounding ingredients by a batch-type kneader. In such a case, the kneading apparatus can be also used in the final step in addition to in the remilling step. When various compounding ingredients in the form of powders are added, as shown in FIG. 8, a hopper 26 may be provided on the kneading apparatus so that the various compounding ingredients are fed together with raw material rubber. In such a case, preferably, a metering feeder used for the various compounding ingredients which is similar to the rubber metering feeder is also connected the kneading apparatus.

(3) A sheet forming device may be provided on the front end of the twin-screw kneading extruder as shown in FIG. 7. The sheet forming device includes an extrusion die 27 and a roller head 28 connected to the front end of the twin-screw kneading extruder. Consequently, sheet forming can be performed directly at the front end of the extruder, and by forming a sheet of the kneaded material, cooling is accelerated and handling in the subsequent step is facilitated.

(4) With respect to the direction of rotation of the screw assembly, twin screws are not always required to rotate in the same direction. The twin screws may have helical blades so as to extrude the material to be kneaded by rotating in the different directions.

(5) The kneading blade section does not necessarily have three blades as described in the above embodiment. The kneading blade section may be composed of one blade or two blades. Alternatively, the kneading blade section may be composed of a plurality of kneading disks.

(6) The dewatering device may have a mechanism in which dewatering is performed by evaporation due to exposure to air. Thereby, power savings can be achieved. In such a case, it is also possible to remove water while preventing the leakage of the material reliably.

(7) The kneading extruder is not necessarily of a twin-screw type, and for example, a single-screw kneading extruder may be used.

EXAMPLES

The present invention will be described more specifically based on the examples. However, it is to be understood that the present invention is not limited to the examples.

Testing was performed using the kneading apparatus in accordance with the first embodiment with a twin-screw kneading extruder having a screw diameter of 59 mm. Cooling water at a temperature of 20° C. was injected by the injection pump. The rubber-based composition used as a raw material had a Mooney viscosity (100° C.) of 100, and it was continuously fed from the rubber metering feeder in which the temperature was adjusted to 60° C. The raw material rubber was fed at a rate of 50 kg/hr and at a rate of 100 kg/hr. Kneading was performed by varying the water-injecting conditions and the speed of rotation of the twin-screw kneading extruder, and then the temperature of the kneaded material at the discharge port of the extruder, a decrease in the Mooney viscosity, and the energy required to perform kneading were measured. The barrel was indirectly cooled by passing cooling water of 20° C. The results thereof are shown in Table 1.

TABLE 1

| | Rubber feeding rate (kg/hr) | Water injection | Rotation speed of twin-screw extruder (rpm) | Temperature of rubber discharged (° C.) | Decrease in viscosity (Mooney viscosity 100° C.) | Energy (kWh/kg) |
| --- | --- | --- | --- | --- | --- | --- |
| Comparative Example | 50 | No injection | 120 | 161 | 19 points | 0.58 |
| Example 1 | 50 | 7% injection (3.5% × 2 spots) | 120 | 123 | 30 points | 0.63 |

TABLE 1-continued

|         | Rubber feeding rate (kg/hr) | Water injection | Rotation speed of twin-screw extruder (rpm) | Temperature of rubber discharged (° C.) | Decrease in viscosity (Mooney viscosity 100° C.) | Energy (kWh/kg) |
|---------|---|---|---|---|---|---|
| Example 2 | 50 | 7% injection (3.5% × 2 spots) | 250 | 173 | 30 points | 0.79 |
| Example 3 | 50 | 14% injection (7% × 2 spots) | 250 | 154 | 36 points | 0.72 |

First, testing performed at a rubber feeding rate of 50 kg/hr will be described. When Example 1 is compared to Comparative Example in which no water injection was performed but with the same rotation speed, obviously, by injecting water, the temperature can be decreased to a level considerably lower than 160° C. which is considered to be the upper limit for the degradation of rubber physical properties. The viscosity is also decreased considerably. This is because the temperature of the rubber is decreased by water cooling and low temperature kneading enables efficient mechanical shearing. The above is also supported by the fact that the amount of energy required to perform kneading is large.

When Example 2 is compared to Example 3 in which the amount of water injected was increased to 14% with the same rotation speed, it has been found that the energy required to perform kneading is decreased due to an increase in the amount of water injected. Since a large amount of water is injected, it is believed that slipping of rubber often occurs in the kneading chamber. Testing was also conducted in other examples not shown in Table 1, and as a result, the energy required to perform kneading generally increased up to an injection of several to several ten percent, and at the amount of injection higher than that, the energy maintained equilibrium or decreased. In the slipping region at an injection of 10% or more, rubber was discharged at low temperatures, the decrease in viscosity was large, and thus kneading was considered to be performed efficiently with low energy. However, water injected was not vaporized sufficiently, water in the liquid state was partially sucked out by the vacuum pump, and rubber was also sucked out together with water. Therefore, operation must be performed at the appropriate upper limit of water injection depending on the evacuating capability, the volume of the chamber, etc.

Although the testing results at a rubber feeding rate of 100 kg/hr were not shown in Table 1, the decrease in temperature and the decrease in viscosity due to the injection of water were observed in the same manner as the case at the rate of 50 kg/hr. It has also been found that energy required to perform kneading decreases as the amount of water injected increases in the same manner as the case at the rate of 50 kg/hr.

Consequently, it has been confirmed that, in accordance with the present invention, it is possible to provide a kneading apparatus for rubber-based compositions having high viscosities in which continuous kneading treatment can be performed without repeated remilling, thus greatly improving productivity, and to provide a kneading method using the kneading apparatus. Additionally, the effects of the examples described above can also be obtained in any embodiment of the present invention and the modifications thereof.

What is claimed is:

1. A method of kneading a rubber-based composition comprising rubber and compounding ingredients using a kneading apparatus comprising a barrel having a cylindrical chamber; a screw assembly rotating in the chamber for extruding a material to be kneaded in the axial direction, said screw assembly comprising a screw section having helical blades and a kneading blade section for allowing the material to flow into the clearance between the inner wall of the chamber and a kneading blade of said kneading blade section, and for applying shearing forces to the material to be kneaded; a metering feeder for feeding the material at a substantially constant volumetric rate or at a substantially constant gravimetric rate from a feed port provided on the barrel into the chamber; an injecting device provided on the barrel for injecting a heat-removing medium into the chamber; a dewatering device that separates the heat-removing medium in a liquid state from the material by subjecting the rubber-based composition to a filling and compressing action; and a discharging device for separating the heat-removing medium in a vapor state from the material, wherein the heat-removing medium has been injected into the chamber by said injecting device and mixed with the material, and discharging the heat-removing medium from the chamber, the method comprising:

a feeding step of feeding the rubber-based composition into the chamber of the kneading apparatus at a substantially constant volumetric rate or at a substantially constant gravimetric rate by the metering feeder, wherein the rubber-based composition has a Mooney viscosity at 100° C. of not less than 100;

a kneading step of allowing the rubber-based composition to flow into the clearance between the inner wall of the chamber and the kneading blade section and moving the rubber-based composition in the chamber while mixing and dispersing the rubber-based composition by means of shearing forces;

a mixing step of injecting a liquid heat-removing medium into the chamber by the injecting device and mixing the rubber-based composition with the heat-removing medium before or during kneading, sufficient to maintain the temperature of the rubber-based composition at 160° C. or less during kneading;

a dewatering step of separating the heat-removing medium in a liquid state from the rubber-based composition by the dewatering device by subjecting the rubber-based composition to a filling and compressing action; and a discharging step of discharging the separated heat-removing medium in a vapor state by the discharging device provided at the location in the axial direction of the dewatering device.

2. The method for kneading a rubber-based composition according to claim 1, wherein the heat-removing medium is water.

3. The method for kneading a rubber-based composition according to claim 1, wherein the discharging device is a vacuum pump connected to the chamber for evacuating the chamber in the region in which said screw section is placed.

* * * * *